United States Patent Office 3,404,132
Patented Oct. 1, 1968

3,404,132
NOVEL POLYMER COMPOSITIONS
AND METHOD
Ritchie A. Wessling, Midland, and Ray G. Zimmerman, Shepherd, Mich., assignors to The Dow Chemical Company, Midland, Mich., a corporation of Delaware
No Drawing. Filed Feb. 23, 1967, Ser. No. 617,834
7 Claims. (Cl. 260—79.5)

ABSTRACT OF THE DISCLOSURE

The polymer compositions are the reaction product of a water-soluble polyelectrolyte derived from a sulfonium salt with a mercaptan or thiol compound or their salts or mixtures thereof in a basic solution, useful as water-resistant, non-conducting protective coatings.

---

This invention concerns novel polymer compositions. More specifically, it concerns compositions comprising novel thermoplastic polymers having recurring units of the structure

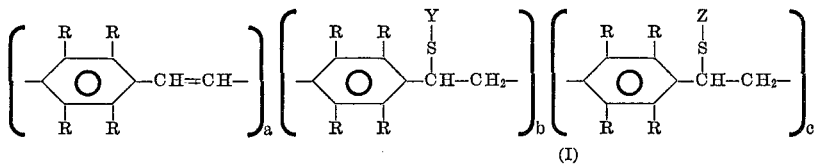

(I)

wherein R represents hydrogen or the methyl group, Y represents an alkyl group containing from 1 to 4 carbon atoms, and Z represents an alkyl, aryl, or aralkyl group which is stable in strongly basic solution such that the mercaptan or thiol compound from which it is derived can form a mercaptide ion, except that when the Z group is the same as the Y group, $b$ equals zero. Suitable mercaptans from which Z can be derived include substituted and unsubstituted alkyl, aryl, or aralkyl compounds or their salts, as well as mixtures thereof. The mole percentage of the structural units in the polymer molecule comprising the novel composition in a random grouping is represented by $a$, $b$, and $c$. The percentage of $a$ can range from 0 to 75 or to the point where the polymer composition remains both thermoplastic and soluble in conventional organic solvents such as dioxane, tetrahydrofuran, chloroform, and orthodichlorobenzene. The sum of the percentages $b$ and $c$ can range from 25 to 100, $b$ from 0 to 66.7, and $c$ from 25 to 100 percent.

The compositions of this invention are useful in such applications as a molding resin, as a coating on metals because of the good adhesion thereto which coating can be fluorescent if desired as well as an ultraviolet light barrier, and as a wire coating because of good insulating (non-conducting) properties. In addition, the compositions can be cured at high temperature to become an infusible, insoluble, thermoset-like composition. The polymer compositions of the invention are sufficiently fusible to be shaped or molded by conventional techniques.

It is a primary object of this invention to provide thermoplastic polymer compositions containing alpha-substituted xylylene units which can be prepared into coatings, films, foams, resins, and powders, and yet can be converted into infusible, insoluble, thermoset-like products. It is a further object to provide a method for preparing the above compositions.

In accordance with this invention it has been discovered that a novel polymer composition having recurring units and properties of the type described above can be prepared by reacting in a basic solution, water-soluble polyelectrolytes such as those described in copending application, Serial No. 591,706, filed November 3, 1966, with a mercaptan or thiol compound or their salts or mixtures thereof. These polyelectrolytes are derived from monomeric sulfonium salts described therein and have recurring units of the structure

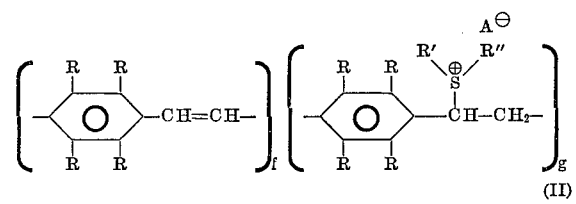

(II)

wherein R has the same meaning as its counterpart heretofore mentioned in the general formula (I) for the polymer composition, R' and R" each represent an alkyl group containing from 1 to 4 carbon atoms and A is a counterion which can be derived from any low molecular weight acid so long as it does not precipitate polymer or react with polymer in aqueous solution. Suitable low molecular weight acids from which the counterion A can be derived include both inorganic acids such as hydrohalic acids which provide a halide ion, e.g., chloride or bromide ion, and carbonic acid which provides a bicarbonate ion, and organic acids such as acetic, propionic, butyric, maleic, citric, or oxalic acid. The ratio of the units comprising the polyelectrolyte structure in a random grouping is represented by the integers $f$ and $g$ in which the ratio $f:g$ ranges up to about 3:1 or to the ratio corresponding to the point of incipient water insolubility. These polyelectrolytes useful in the practice of the invention can either be isolated or directly reacted from the solution in which they were prepared.

Mercaptans or thiol compounds suitable for use in the practice of the invention include alkyl, aryl, or aralkyl mercaptans or their salts as well as mixtures thereof, so long as they react with base in aqueous solution to form mercaptide ions which in turn react with the sulfonium ion. Included are both substituted and unsubstituted alkyl, aryl, or aralkyl compounds or their salts such as 1-butanethiol, 1-pentanethiol, 3-methyl-1-butanethiol, 2,2-dimethyl propanethiol, 1-hexanethiol, 1-heptanethiol, 1-octanethiol, 1-nonanethiol, 1-decanethiol, 1-dodecanethiol, 1-tetradecanethiol, 1-octadecanethiol, cyclohexyl mercaptan, and the like. Also included are aliphatic dimercaptans such as 1,2-ethanedithiol, 1,3 - propanedithiol, 1,4 - butanedithiol, 1,5-pentanedithiol, 1,8-octanedithiol, and the like.

In addition there are included aryl mercaptans or thiol compounds such as benzenethiol (thiophenol), p-mercaptotoluene, o-mercaptotoluene, p-t-butylbenzenethiol, 2-methyl-4-t-butylbenzenethiol, 2-naphthalenethiol, p-dimercaptobenzene, o-dimercaptobenzene and the like.

Also included are aralkyl mercaptans such as α-mercaptotoluene (benzyl mercaptan), α,α' - dimercapto-p-xylene and the like.

Solutions of the mercaptans or thiol compounds in an inert water-miscible organic solvent such as alcohol or dioxane can be employed and are usually preferred, but are not necessary.

The polymers formed by reaction with monofunctional mercaptans are soluble in organic solvents such as benzene, dioxane, chloroform, and the like, if the $a/(b+c)$ ratio is not too large. The specific solubility characteristics as well as physical properties are sensitive to the nature of the Y and Z groups and the $a/(b+c)$ ratio as well as to the $b:c$ ratio. The color and fluorescence of the polymer, however, seem to depend mainly on the $a/(b+c)$ ratio. As this ratio increases, the polymers become harder, infusible, more deeply colored and fluorescent at longer wavelengths.

The polymer compositions of the inventions are amorphous and thermoplastic when prepared. They can be compression molded into tough pieces, or dissolved in a suitable solvent and cast into films or coatings. These coatings are insensitive to moisture, opaque to ultraviolet light, have good thermal and oxidative stability and good abrasion resistance. They adhere well to most substrates, particularly wood or metals, making them useful as coatings.

The softening points and molding temperatures of the new polymer compositions are related to the flexibility of the side groups Y and Z. Polymers with rigid groups such as benzyl and naphthyl soften above 50° C., while polymers with alkyl side groups such as tetradecyl soften at room temperature if the $a/(b+c)$ ratio is not too large.

The novel thermoplastic polymer compositions of the invention can be thermally cured to produce hard, insoluble, infusible, thermoset-like materials by heating to temperatures of about 200°–300° C. These products are more thermally stable than the original polymeric materials and show excellent solvent resistance.

The following non-limiting examples serve to illustrate the invention.

good insulating properties. The films exhibit high ultraviolet absorption and good thermal stability.

EXAMPLE II (A) Preparation of polyelectrolyte from p-phenylene dimethylene bis(diethyl sulfonium chloride). 500 ml. of 2.0 N p-phenylene dimethylene bis(diethyl sulfonium chloride) was purged with nitrogen and chilled to 0° C. Thereafter, 500 ml. of 2.0 N sodium hydroxide was added that was prechilled to 0° C. and also purged with nitrogen. The sodium hydroxide solution was added with rapid stirring.

The reaction mixture was orange-brown at the start of the reaction, and after reacting for 15 minutes the mixture was greenish yellow. 500 ml. of 1 N HCl was added to the reaction mixture after 15 minutes reaction in order to quench the reaction. The material was so viscous that it was cut into pieces with a pair of scissors and placed in a Waring Blendor. Water (2200 ml.) was added thereto and blended until a pourable liquid resulted. The pH of the mixture was 6.

The material was dialyzed against deionized water, then run through a Waring Blendor to remove a few gel pieces. The total volume of material after dialysis was 6900 ml. This polyelectrolyte material had a normality of 0.03. The yield of polyelectrolyte was calculated to be 41 percent (207 meq.) and consisted of the following structural units

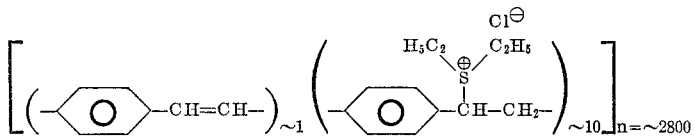

EXAMPLE I

Preparation of a polymer composition according to the invention containing xylylidene, α-(methylthio) xylylene and α-phenylthio) xylylene units.

50 cc. of 0.2 N sodium hydroxide solution was added to 50 cc. of 0.2 N p-phenylene dimethylene bis(dimethyl sulfonium chloride) at a temperature of 75° C. The solution was allowed to react for 20 seconds (52 percent reaction as determined by the amount of hydroxide consumed) and then was poured into a methanol solution of sodium thiophenate. A yellow polymer separated out. The product was washed with methanol and acetone, and dried in vacuo at a temperature of 50° C. The yield was 0.57 gram (56 percent of theoretical) of a hard, yellow plastic containing 11 percent sulfur which was readily soluble in ortho-dichlorobenzene and chloroform.

Films cast from solution were hard, yellow and fluorescent. The product was identified by infrared and elemental analysis to be wherein $n$ represents the number average degree of polymerization of the polyelectrolyte.

(B) Preparation of the phenylthio derivative of the polyelectrolyte of (A). 2 cc. of thiophenol was mixed in 50 cc. of methanol, 20 cc. of 1 N sodium hydroxide solution having been added thereafter. This mixture was poured rapidly into 250 cc. of the polyelectrolyte material of (A) and shaken vigorously. Thereupon, a white precipitate formed immediately. The mixture was diluted to 600 cc. with methanol and held 16 hours. The precipitate was washed four times with methanol. The washings were repeated with n-pentane. The residue was then dried. The product was an off-white, hard, amorphous material which dissolved readily in benzene.

The produce was dissolved in benzene. A small amount of gel remained which was filtered off. The clear solution was freeze-dried, then dried in vacuo. The yield was

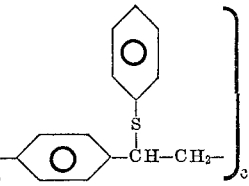

wherein $a$ was about 50 percent, $b$ was about 10 percent, and $c$ was about 40 percent of the polymer, and the number average degree of polymerization was about 100.

Thermal gravimetric analysis showed a sharp weight loss leveling off at about 30 percent above 310° C. After heat treatment, the material was harder, darker yellow, and insoluble in common solvents.

The material softened at about 50° C. and was compression molded at 100° C. to produce a tough yellow sheet.

The various films and coatings discussed herein exhibit 1.5 grams of a polymer composition according to the invention having the following structural units

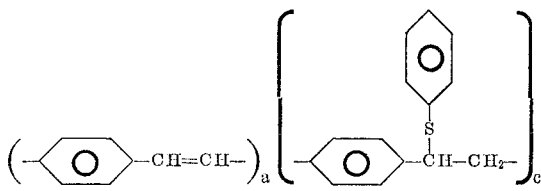

wherein the number average degree of polymerization was about 2800 and wherein $a$ was about 9 percent, $b$ was essentially zero, and $c$ was about 91 percent of the polymer. The number average molecular weight of the polymer was determined to be about 600,000 by osmometry. A comparison of the thoretical and actual amounts of carbon, hydrogen, and sulfur contained in the polymer was made showing Theoretical: C, 79.2%; H, 5.7%; S, 15.1%. Found: C, 78.7%; H, 6.2%; S, 14.1%.

The polymer was nearly colorless, transparent and showed blue fluorescence under ultraviolet excitation. The polymer was cast on a steel plate forming a water-resistant, non-conducting, protective coating.

EXAMPLE III (A) Preparation of polyelectrolyte solution. To 500 ml. of a 2.0 N solution of the monomeric salt p-phenylene dimethylene bis(dimethyl sulfonium chloride) was added a mixture containing 200 ml. of benzene and 50 ml. of methylene chloride. The mixture was cooled to 0° C. under an argon atmosphere. The reaction was started by adding thereto 500 ml. of a 2.0 N sodium hydroxidie solution which had been cooled to 0° C. under a nitrogen atmosphere. The reaction was quenched after 30 minutes by adding thereto 500 ml. of 1.0 N HCl solution. Enough water was added to the mixture to have a volume of 5000 ml. which was thereafter mixed in a Waring Blendor.

The polyelectrolyte formed by the reaction had recurring units of the following structure

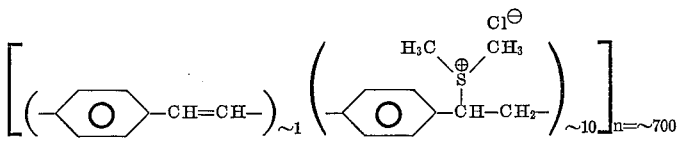

This polymer was not isolated from its reaction mixture but was reacted directly with various mercaptans or thiol compounds by the procedure described below to produce the compositions of the invention.

(B) Preparation of polymer of compositions according to the invention. A merctaptide solution was prepared by dissolving the appropriate mercaptan in a basic aqueous ethanol solution prepared by dissolving 57.2 grams of sodium hydroxide in 100 ml. of water and diluting to 1300 ml. with absolute ethanol. The amount of each mercaptan as listed below was dissolved respectively in 100 ml. of the basic aqueous ethanol.

Mercaptan: Weight, grams
  Thiophenol _____ 11.1
  Benzyl mercaptan _____ 13.6
  p-t-Butylbenzenethiol _____ 18.3
  2-naphthalenethiol _____ 17.6
  n-Decyl mercaptan _____ 19.2

500 ml. of the polyelectrolyte solution prepared in (A) was added rapidly to each mercaptide solution. The mixture was added rapidly to each mercaptide solution. The mixture was agitated until a lump of yellow-green gel separated out.

The reaction mixtures were held at room temperature for 24 hours. At this point, the aqueous phase was decanted, and the polymer washed free of salts with methanol. Residual mercaptan was removed by extraction with acetone. The remaining solids were dispersed in dioxane. A small amount (<1%) of gel was removed by centrifugation and filtration. Films were cast from the clarified solutions on glass plates at 50° C. The films were hard, transparent, yellow-green and intensely fluorescent under ultraviolet excitation. These films are water-resistant, non-conducting and adhere well to such substrates as wood, paper, steel, aluminum and stone. Therefore, they are useful as protective coatings.

The structures of the novel polymer compositions are determined from nuclear magnetic resonance, infrared spectra, elemental analysis and osmotic pressure molecular weight to be

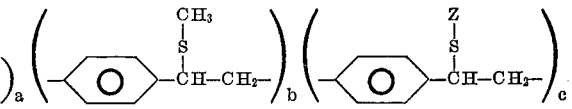

wherein the number average degree of polymerizaton was approximately 700.

The properties of these novel polymeric compositions depend on the side group Z. The glass transition temperatures are shown below:

| Side group Z | $T_g$,* °C. | Mole Percent | | |
|---|---|---|---|---|
| | | $a$ | $b$ | $c$ |
| Phenyl | 61 | 9 | 73 | 18 |
| Benzyl | 64 | 9 | 30 | 61 |
| t-Butylphenyl | 112 | 9 | 73 | 18 |
| Naphthyl | 82 | | | |
| n-Decyl | 26 | 9 | 30 | 61 |

*Measured by differential thermal analysis.

$T_g$ indicates the approximate temperature at which the polymer changes from a glassy state to a leathery or rubbery state. None of these polymers were crystalline. The temperature at which they can be molded lies slightly above the $T_g$. For example, the benzyl derivative can be molded to a hard, transparent yellow sheet at about 100° C.; for the t-butylphenyl derivative, molding can be carried out at about 150° C.

EXAMPLE IV 19.5 grams of 2,5-dimethyl-p-phenylene dimethylene bis(diethyl sulfonium chloride) was dissolved in 250 ml. of deionized water. After cooling to 5° C. and flushing with nitrogen, 50 ml. of cold 1 N sodium hydroxide solution was added with rapid stirring. After 10 minutes, the mixture was diluted to 4000 ml. with ice water. The mixture was dialyzed against deionized water to isolate the polyelectrolyte obtained from the salt by-product, and a portion (22.5 percent) of this was mixed with 10 ml. of thiophenyl dissolved in 100 ml. of tetrahydrofuran. After mixing thoroughly, 25 ml. of 1 N sodium hydroxide solution was added rapidly. After one hour, the coagulated polymer was recovered, isolated, purified and dried yielding 0.92 gram of a white solid with intense blue fluorescence. The polymeric product according to the invention was identified from infrared analysis and nuclear magnetic resonance to be

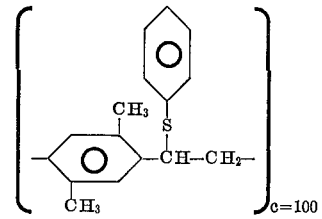

wherein the $a$ and $b$ units essentially equaled zero. The number average molecular weight of the polymer was determined to be about 1,450,000 by osmometry. The number average degree of polymerization was determined to be about 6000. The glass transition temperature as measured by differential thermal analysis was 58° C.

A film was cast from a 2 percent solution of the polymer in tetrahydrofuran. The film was clear, flexible and almost colorless. It was opaque to ultraviolet light. A coating made from the above solution adhered well to wood and metal substrates and provided a clear water-resistant coating.

We claim:
1. A polymer composition having recurring units of the structure

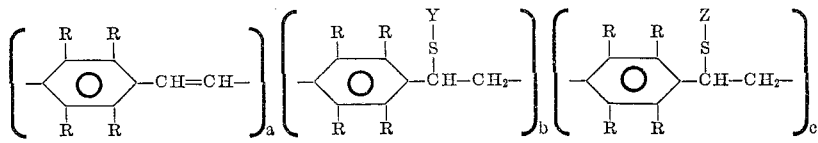

wherein R represents hydrogen or the methyl group, Y represents an alkyl group containing from 1 to 4 carbon atoms, Z represents an alkyl, aryl, or aralkyl group which is stable in strongly basic solution such that the mercaptan or thiol compound from which it is derived can form a mercaptide ion except that when Z is the same as Y, $b$ equals zero, and $a$, $b$, and $c$ represent the mole percent of the structural units comprising the polymer, the sum of which equals 100 and in which $a$ can range from 0 to 75 or to the point where the polymer composition remains both thermoplastic and soluble in organic solvents, $b$ from 0 to 66.7 and $c$ from 25 to 100.

2. The composition of claim 1 wherein $a$ equals zero.
3. The composition of claim 1 wherein $b$ equals zero.
4. The composition of claim 1 wherein both $a$ and $b$ equal zero.
5. The composition of claim 1 wherein Z is selected from the group consisting of phenyl, benzyl, t-butylphenyl, naphthyl, and $C_1$ to $C_{10}$ alkyl.
6. The composition of claim 1 which additionally has been thermally cured at a temperature from about 200° to 300° C.
7. A process for making the novel polymer compositions of claim 1 which comprises reacting in a basic solution a water-soluble polyelectrolyte with a mercaptan or thiol compound or their salts or mixtures thereof, the polyelectrolyte having recurring units of the structure

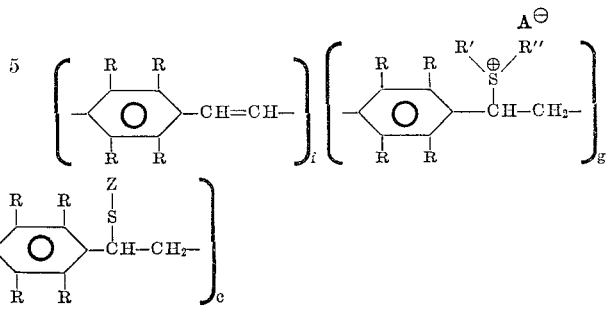

wherein R represents hydrogen or the methyl group, R' and R" each represents an alkyl group containing from 1 to 4 carbon atoms, A represents a counterion which can be derived from any low molecular weight acid as long as it does not precipitate polymer or react with polymer in aqueous solution, and the ratio of units comprising the polyelectrolyte structure is represented by the integers $f$ and $g$ in which the ratio of $f:g$ ranges up to about 3:1 or to the ratio corresponding to the point of incipient water insolubility.

References Cited
UNITED STATES PATENTS 3,110,687 11/1963 Smith _____ 260—214
3,342,790 9/1967 Vries _____ 260—79.5

OTHER REFERENCES

Houben-Weyl, Methoder der Organischen Chemie, 1953, p. 191.

JOSEPH L. SCHOFER, *Primary Examiner.*

D. K. DENENBERG, *Assistant Examiner.*